(12) United States Patent
Buyuksahin

(10) Patent No.: US 10,917,627 B2
(45) Date of Patent: Feb. 9, 2021

(54) SYSTEM AND A METHOD FOR CAPTURING AND GENERATING 3D IMAGE

(71) Applicant: Utku Buyuksahin, Kadikoy/Istanbul (TR)

(72) Inventor: Utku Buyuksahin, Kadikoy/Istanbul (TR)

(*) Notice: Subject to any disclaimer, the term of this patent is extended or adjusted under 35 U.S.C. 154(b) by 0 days.

(21) Appl. No.: 16/306,677

(22) PCT Filed: Jun. 3, 2016

(86) PCT No.: PCT/TR2016/000078
§ 371 (c)(1),
(2) Date: Dec. 3, 2018

(87) PCT Pub. No.: WO2017/209707
PCT Pub. Date: Dec. 7, 2017

(65) Prior Publication Data
US 2019/0230342 A1   Jul. 25, 2019

(51) Int. Cl.
*H04N 13/257* (2018.01)
*G06T 7/586* (2017.01)
*H04N 13/254* (2018.01)
*H04N 13/207* (2018.01)
*H04N 13/296* (2018.01)

(52) U.S. Cl.
CPC .......... *H04N 13/257* (2018.05); *G06T 7/586* (2017.01); *H04N 13/207* (2018.05); *H04N 13/254* (2018.05); *H04N 13/296* (2018.05); *G06T 2207/10024* (2013.01); *G06T 2207/10152* (2013.01)

(58) Field of Classification Search
None
See application file for complete search history.

(56) References Cited

U.S. PATENT DOCUMENTS 8,009,871 B2 * 8/2011 Rafii ................. G06K 9/00201
382/106
9,618,827 B2 * 4/2017 Shatz .................... F21V 7/0075
(Continued)

OTHER PUBLICATIONS

International Search Report and Written Opinion for corresponding PCT application No. PCT/TR2016/000078, dated Feb. 24, 2017.
(Continued)

*Primary Examiner* — Jayanti K Patel
*Assistant Examiner* — Stefan Gadomski
(74) *Attorney, Agent, or Firm* — Notaro, Michalos & Zaccaria P.C.

(57) ABSTRACT

A method and system for capturing and generating a 3 dimensional image of a target using a single camera. The system has at least one light source which intensity is able to be adjusted, at least one image recorder that captures images of a target that has a plurality of obstacles, and at least one control unit not shown in figures, that controls the light source by increasing or decreasing its intensity within a time period, that controls the image recorder so as to capture a plurality of images of said target within said time period, and that determines the depth of the obstacles so as to capture and generate a 3 dimensional image by comparing the illumination level change of the obstacles between captured images within the time period.

9 Claims, 3 Drawing Sheets

(56) References Cited

U.S. PATENT DOCUMENTS

| | | | |
|---|---|---|---|
| 9,704,250 B1* | 7/2017 | Shah | H04N 5/23212 |
| 10,194,129 B2* | 1/2019 | Chang | H04N 13/254 |
| 10,277,842 B1* | 4/2019 | Cooper | H04N 5/2354 |
| 2006/0285741 A1* | 12/2006 | Subbarao | G06T 5/50 |
| | | | 382/154 |
| 2008/0056569 A1* | 3/2008 | Williams | G06T 5/50 |
| | | | 382/173 |
| 2009/0128652 A1* | 5/2009 | Fujii | G06T 7/254 |
| | | | 348/222.1 |
| 2010/0034457 A1* | 2/2010 | Berliner | G06K 9/00362 |
| | | | 382/154 |
| 2011/0242283 A1* | 10/2011 | Tyagi | G01B 11/2545 |
| | | | 348/46 |
| 2011/0262007 A1* | 10/2011 | Kojima | G01B 11/2509 |
| | | | 382/103 |
| 2012/0092459 A1 | 4/2012 | Tubert et al. | |
| 2012/0105585 A1* | 5/2012 | Masalkar | G06F 3/017 |
| | | | 348/46 |
| 2012/0176552 A1* | 7/2012 | Ryu | H04N 21/4223 |
| | | | 348/734 |
| 2012/0179472 A1* | 7/2012 | Ryu | G06F 3/017 |
| | | | 704/275 |
| 2012/0269384 A1* | 10/2012 | Jones | G06K 9/00201 |
| | | | 382/103 |
| 2012/0287247 A1* | 11/2012 | Stenger | H04N 13/271 |
| | | | 348/47 |
| 2013/0069934 A1 | 3/2013 | Wang | |
| 2013/0243313 A1* | 9/2013 | Civit | G06T 5/002 |
| | | | 382/164 |
| 2013/0329015 A1* | 12/2013 | Pulli | H04N 13/239 |
| | | | 348/47 |
| 2014/0028804 A1* | 1/2014 | Usuda | G01S 17/023 |
| | | | 348/47 |
| 2014/0277636 A1* | 9/2014 | Thurman | A63B 71/0605 |
| | | | 700/91 |
| 2014/0307056 A1* | 10/2014 | Collet Romea | H04N 5/272 |
| | | | 348/47 |
| 2015/0077591 A1* | 3/2015 | Fujiwara | H04N 5/23216 |
| | | | 348/234 |
| 2015/0097680 A1* | 4/2015 | Fadell | F24F 11/30 |
| | | | 340/628 |
| 2015/0193973 A1 | 7/2015 | Langguth et al. | |
| 2015/0208057 A1 | 7/2015 | Wu et al. | |
| 2015/0222881 A1* | 8/2015 | Lee | H04N 5/265 |
| | | | 348/47 |
| 2015/0226553 A1* | 8/2015 | Fuchikami | G06T 7/586 |
| | | | 348/135 |
| 2015/0256811 A1* | 9/2015 | Lee | H04N 13/106 |
| | | | 348/49 |
| 2015/0281678 A1* | 10/2015 | Park | H04N 5/23238 |
| | | | 348/43 |
| 2015/0323310 A1* | 11/2015 | Coon | G06K 9/0061 |
| | | | 348/135 |
| 2016/0057340 A1 | 2/2016 | You et al. | |
| 2016/0080727 A1* | 3/2016 | Komatsu | H04N 13/271 |
| | | | 348/49 |
| 2016/0148343 A1* | 5/2016 | Yan | G06T 7/11 |
| | | | 345/660 |
| 2016/0295193 A1* | 10/2016 | Van Nieuwenhove | H04N 13/122 |
| 2016/0330366 A1* | 11/2016 | Kinoshita | H04N 5/23222 |
| 2016/0343169 A1* | 11/2016 | Mullins | G06T 19/006 |
| 2016/0349043 A1* | 12/2016 | Lee | G01B 11/2513 |
| 2017/0078648 A1* | 3/2017 | Saunders | H04N 13/246 |
| 2017/0289451 A1* | 10/2017 | Wittenberg | H04N 5/2252 |
| 2017/0308736 A1* | 10/2017 | Sharma | G06T 7/11 |
| 2017/0374269 A1* | 12/2017 | Govindarao | G02B 7/38 |

OTHER PUBLICATIONS

International Preliminary Report on Patentability for corresponding PCT application No. PCT/TR2016/000078, dated Sep. 4, 2018.

Written Opinion of the International Preliminary Examining Authority for corresponding PCT application No. PCT/TR2016/000078, dated May 3, 2018.

Lu, Thomas and Chao, Tien-Hsin; "A single-camera system captures high-resolution 3D images in one shot"; The International Society of Optical Engineering; DOI: 10.1117/2.1200611.0303.

* cited by examiner

SYSTEM AND A METHOD FOR CAPTURING AND GENERATING 3D IMAGE

TECHNICAL FIELD

Present invention is related to a method and system for generating a 3 dimensional image of a target using a single camera.

PRIOR ART 3 dimensional image of a target element or a scene is usually generated by using plurality of (at least two) image recorders (cameras), wherein each image recorder records an image of said target element or scene at a different angle. By combining the images recorded by said image recorders, depth information for the target element or scene is generated. Thus, by using the depth information, a 3D image of the target element or scene is able to be generated.

In order to generate depth information, most of the known techniques require at least two image recorders. However, using two image recorders is an expensive solution.

Moreover, using two image recorders on a single device (for example a portable device like a mobile phone) causes heating problem on said device.

In order to overcome said problems, systems that generate 3D images using single image recorder are proposed. Article of Thomas Lu and Tien-Hsin Chao "A single-camera system captures high-resolution 3D images in one shot" (DOI: 10.1117/2.1200611.0303) discloses a system and method for capturing a 3D image using a single camera. According to said article, an optical system is attached to the camera in order to capture two different images from different angles. Then, said images are combined so as to generate a 3D image. However, according to said article, since 2 different images are generated at the same time, resolution of each image is half of the resolution of the camera. In other words, according to said article, resolution of the generated 3D image is less than the actual resolution of the camera. Moreover, since said method requires an rare found optical system, also the dimensions of the camera increases. Therefore, said method may not be used with mobile devices, sizes of which are limited.

BRIEF DESCRIPTION OF THE INVENTION

According to the present invention, a method and a system for generating a 3 dimensional image of a target using a single camera are provided. Said system comprises, at least one light source, intensity of which is able to be adjusted; at least one image recorder, which captures images of a target comprising plurality of obstacles; and at least one control unit (5), which controls said light source by increasing or decreasing its intensity within a time period, which controls said image recorder so as to capture plurality of images of said target within said time period, and which determines the depth of said obstacles so as to capture and generate a 3 dimensional image by comparing the illumination level change of the obstacles between captured images within said time period. Said method comprises the steps of, increasing or decreasing the intensity of said light source within a time period; capturing the images of said target via said image recorder within said time period; and determining the depth of said obstacles, so as to capture and generate a 3 dimensional image, by comparing the illumination level change of the obstacles between captured images within said time period via at least one control unit.

According to the present application, since one image recorder, intensity adjustable light source and a control unit (5) is enough for capturing and generating a 3D image, conventional portable devices with cameras, such as mobile phones/smart phones, can be used for capturing and generating 3D images. Therefore, without changing the hardware of a mobile phone/smart phone, 3D images are able to be captured and generated easily.

OBJECT OF THE INVENTION

The main object of the present invention is to provide a system and method for capturing and generating a 3 dimensional image of a target using a single camera.

Another aim of the present invention is to provide a system and method for capturing and generating a 3 dimensional image which can be easily implemented on portable devices.

Another aim of the present invention is to provide a system and method for capturing and generating a 3 dimensional video of a target using a single camera.

Another aim of the present invention is to provide a cheap and reliable system and method for capturing and generating a 3 dimensional image and video.

Figure 1:
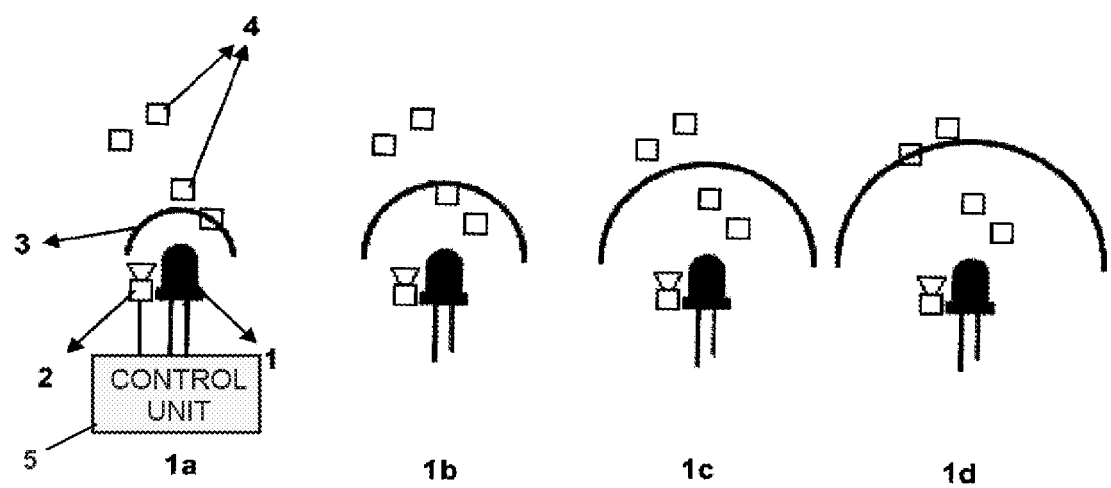
FIG. 1 shows an exemplary embodiment of the 3 dimensional image capture and generation system of the present invention.

The references in the figures may possess following meanings;

| | |
|---|---|
| Light source | (1) |
| Image recorder | (2) |
| Illumination range | (3) |
| Obstacle | (4) |

DETAILED DESCRIPTION OF THE INVENTION 3 dimensional images contain image data and depth data. In the conventional methods, in order to capture and generate a 3D image of a target (an object or a scene), images having different viewpoints are used. Therefore, conventional methods require plurality of image recorders (cameras) in order to capture and generate a 3D image. According to the present invention, a method and system for capturing and generating a 3 dimensional image of a target using a single camera are provided. 3 dimensional image capture and generation system of the present invention, exemplary embodiments of which are given in FIGS. 1-4, comprises at least one light source (1), intensity of which is able to be adjusted; at least one image recorder (2) (such as a camera), which captures images (2 dimensional images) of a target comprising plurality of obstacles (4); and at least one control unit (5), which controls said light source (1) by increasing or decreasing its intensity within a time period, which controls said image recorder (2) so as to capture plurality of images of said target within said time period, and which determines the depth of said obstacles (4) so as to capture and generate a 3 dimensional image by comparing the illumination level change of the obstacles (4) between captured images within said time period.

3 dimensional image capture and generation method of the present invention comprises the steps of, increasing or decreasing the intensity of at least one light source (1) within a time period, wherein said light source (1) illuminates a target comprising plurality of obstacles (4); capturing the images of said target via at least one image recorder (2) within said time period; determining the depth of said obstacles (4), so as to capture and generate a 3 dimensional image, by comparing the illumination level change of the obstacles (4) between captured images within said time period via at least one control unit. In a preferred embodiment, by using the determined depth of the obstacles (4), a saliency map, which is used in 3 dimensional image applications, is generated.

An exemplary embodiment of the present invention, which is given in FIG. 1, intensity of the light source (1) is increased within a time period. At the start of said time period, 1a time, intensity of light source (1) is so low that illumination range (3) of the light source (1) is only able to illuminate the obstacle (4) closest to the light source (1). During that time, image captured by the image recorder (2) shows that only the obstacle (4) closest to the light source (1) is illuminated. When the intensity of the light source (1) is increased, 1b time, illumination range (3) of the light source (1) reaches the obstacle (4), which is second closest to the light source (1). During 1 b time, image captured by the image recorder (2) shows that only the two obstacles (4) that are closest to the light source (1) are illuminated. By comparing the illumination level change of two obstacles (4) that are closest to the light source (1) between the images captured at 1a time and 1b time, distances between the light source (1) and said obstacles (4) are able to be calculated. By further increasing the intensity of the light source (1) at 1c and 1d times and comparing the illumination level change of the obstacles (4) during those times, distances between the light source (1) and said obstacles (4) are able to be calculated. By using said distance information and distance between the light source (1) and image recorder (2), distances between the image recorder (2) and said obstacles (4) (which are the depths of said obstacles (4)) are calculated. This embodiment is preferred in relatively dark environment because illumination level increase of the obstacles (4) over time becomes apparent. Moreover, When the highest illumination range (3) is achieved (as shown in FIGS. 1d and 2a), it is also possible to determine the depth order of the illuminated obstacles (4) according to the colour change differentiation level of each obstacle (4). The closest obstacle (4) will be brighter and the colour differentiation will be the highest and vice versa.

Figure 2:
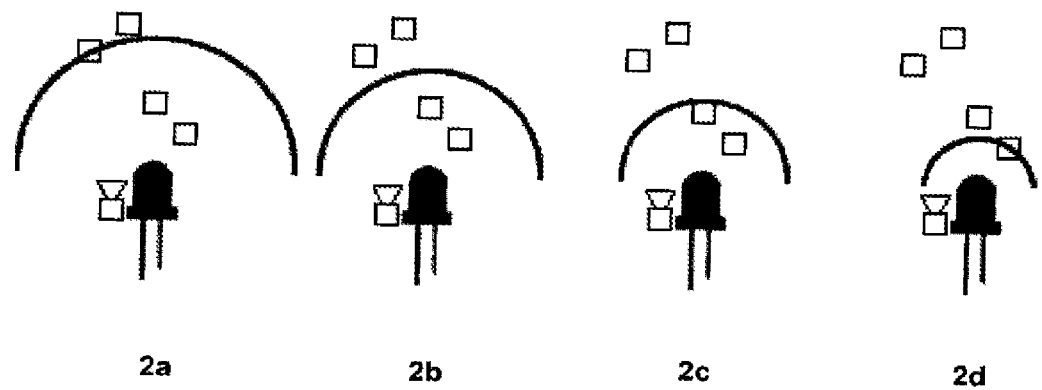
FIG. 2 shows another exemplary embodiment of the 3 dimensional image capture and generation system of the present invention.

An alternative exemplary embodiment of the present invention is given in FIG. 2. In this embodiment, intensity of the light source (1) is decreased within a time period. Similar to previous embodiment, by using illumination level change of the obstacles (4) over different times (2a-2d times), depth information for each of the obstacles (4) are able to be calculated. In this embodiment, illumination level of the obstacles (4) decreases over time. Therefore, this embodiment is preferred in relatively bright environments.

Figure 3:
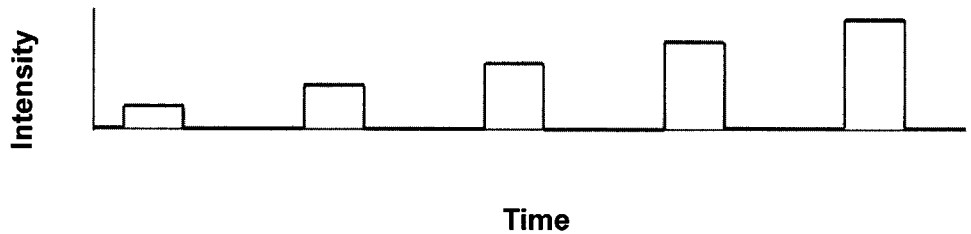
FIG. 3 shows an intensity of a light source versus time graph of an exemplary embodiment of the present invention.

In a preferred embodiment of the present invention, intensity of the light source (1) changes (increases or decreases) stepwisely as shown in FIG. 3. Steps of intensity may change discretely (in other words intensity of the light source (1) becomes 0 for a short time between two steps) or may change continuously (in other words intensity of the light source (1) increases or decreases as stair steps). In these embodiments, width of each step (time gap of each intensity level) is preferably equal to or greater than the shutter speed (exposure time) of the image recorder (2), so that intensity of the light source (1) does not change within an exposure time. Therefore, illumination levels of the obstacles (4) are able to be determined more accurately.

Figure 4:
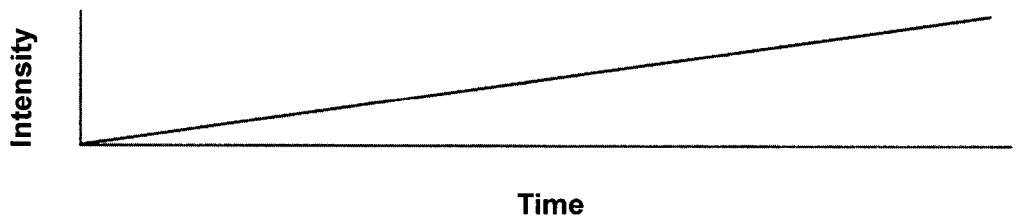
FIG. 4 shows another intensity of a light source versus time graph of an exemplary embodiment of the present invention.
Figure 5:
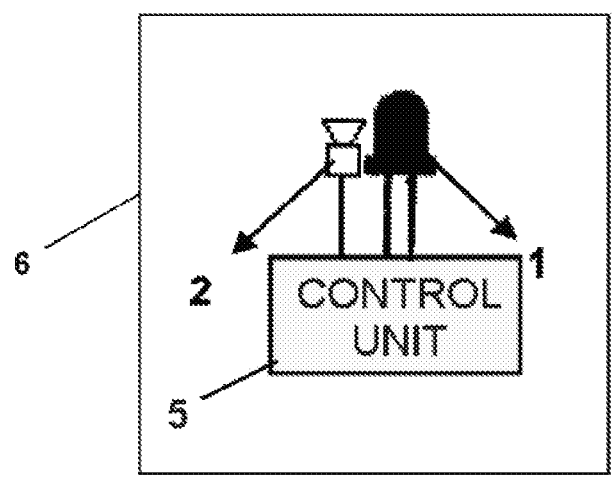
FIG. 5 shows a portable device having a single image recorder and one intensity adjustable light source according to an embodiment of the invention.

In another preferred embodiment of the present application, intensity of the light source (1) changes in continuous manner as shown in FIG. 4.

In another embodiment of the present application, colour (wavelength) of the light source (1) is able to be adjusted by said control unit (5). Since different coloured obstacles (4) absorb different coloured lights, illumination level change of an obstacle (4) may not be apparent if it is illuminated with a specific coloured light source (1). Therefore, according to this embodiment, if illumination level change of an obstacle (4) is not apparent within a time period, colour of the light source (1) is changed and steps of increasing or decreasing the intensity of at least one light source (1); capturing the images of said target via at least one image recorder (2) and determining the depth of said obstacles (4) are repeated for the new colour. Therefore, depth information of the obstacles (4) are determined more accurately.

In another embodiment, light intensity of the light source (1) outspreads in semispherical form. In this embodiment, depth of the obstacles are able to be calculated in a polar coordinate system.

In another preferred embodiment of the present application, 3 dimensional image capture and generation system is used for capturing and generating 3 dimensional videos. In this embodiment, firstly depth of different obstacles (4) are determined according to above mentioned applications and initial sizes of the obstacles (4) are determined within captured images (size of the obstacles (4) are determined in terms of pixels). Then, a video is recorded using said image recorder (2) or another video recording device. During said recording, depth of the obstacles (4) may change. In order to determine said depth change, relative size changes of the obstacles (4) are measured (again in terms of pixels). Since said relative size change is related with the depth change, new depth of the obstacles (4) are able to be calculated.

In another preferred embodiment of the present application, after the depth of the obstacles (4) are determined, said depth information is used for distinguish a foreground object from a background object. Thus, it is possible to change a background object to another captured image or video. In other words, according to the system and method of the present application, greenbox (or bluebox or same purpose) applications are able to be used without a green (or blue) screen.

According to the present invention, one image recorder (2) is enough for determining depth information and capturing and generating a 3D image. However, in alternative embodiments of the present application, plurality of image recorders (2) may be used. In the conventional application, wherein at least two cameras are used for generating a 3D image, viewpoint of the cameras are different. Therefore, if one segment of a target is seen by only one camera, intrusions/extrusions on said segment cannot be identified. The embodiment, wherein plurality of image recorders (2) are used, overcomes said problem. Therefore, according to the present application, more accurate depth information and more accurate 3D image are able to be captured and generated.

According to the present application, since one image recorder (2), intensity adjustable light source (1) and a control unit 5 is enough for generating a 3D image, a conventional portable device 6 with a camera 2, such as a mobile phone/smart phone, can be used for capturing and generating 3D images. Therefore, without changing the hardware of a mobile phone/smart phone, 3D images are able to be captured and generated easily.

The invention claimed is:

1. A 3 dimensional image generation system that captures and generates a 3 dimensional image of a target comprising plurality of obstacles (4), characterized by comprising;
   a single light source (1), the intensity of which is able to be adjusted and the colour of which is able to be adjusted to a plurality of different colors including at least a first colour and a second colour;
   one or more image recorders (2), which captures images of said target and
   portable device hardware comprising one or more control units (5), which controls said light source (1) by adjusting the colour of the light source to the first color and increasing or decreasing its intensity within a time period, wherein intensity of the light source (1) changes stepwisely or continuously, which controls said image recorder (2) so as to capture a plurality of images of said target within said time period, and which determines the depth of said obstacles (4) so as to capture and generate a 3 dimensional image by comparing the illumination level change of the obstacles (4) between captured images within said time period;
   wherein the one or more control units (5) further controls said light source by changing the colour of the light source (1) from the first colour to the second colour and repeating the steps of increasing or decreasing the intensity of the light source (1); capturing the images of said target via one or more image recorders (2) and determining the depth of said obstacles (4) for the second colour of the light source (1), such that depth information of the obstacles (4) is determined more accurately.

2. A system according to claim 1, characterized in that; light intensity of the light source (1) outspreads in semispherical form.

3. A 3 dimensional image generation method that captures and generates a 3 dimensional image of a target comprising a plurality of obstacles (4), characterized by comprising the steps of;
   increasing or decreasing the intensity of a single light source the colour of which is able to be adjusted to a plurality of different colors including at least a first colour and a second colour (1) within a. time period, wherein said light source (1) emits light of the first colour and illuminates said target and wherein intensity of the light source (1) changes stepwisely or continuously:
   capturing the images of said target via one or more image recorders (2) within said time period;
   determining the depth of said obstacles (4), so as to capture and generate a 3 dimensional image, by comparing the illumination level change of the obstacles (4) between captured images within said time period via portable device hardware comprising one or more control units (5);
   wherein the one or more control units (5) further controls said light source by changing the colour of the light source (1) from the first colour to the second colour and repeating the steps of increasing or decreasing the intensity of the light source (1); capturing the images of said target via one or more image recorders (2) and determining the depth of said obstacles (4) for the second colour of the light source (1), such that depth information of the obstacles (4) is determined more accurately.

4. A method according to claim 3, characterized by further comprising the step of, determining a saliency map for one or more captured images using the determined depth of the obstacles (4).

5. A method according to claim 3, characterized by further comprising the steps of, changing the colour of the light source (1) from the first colour to the second colour and repeating the steps of increasing or decreasing the intensity of the light source (1); capturing the images of said target via one or more image recorders (2) and determining the depth of said obstacles (4) for the second colour of the light source (1), such that depth information of the obstacles (4) is determined more accurately.

6. A method according to claim 3, characterized by further comprising the steps of, determining the initial sizes of the obstacles (4) and recording a video, wherein depth changes of the obstacles (4) during said recording are determined according to their size change with respect to their determined initial sizes.

7. A method according to claim 3, characterized by further comprising the step of, distinguishing a foreground object from a background object by using determined depth information of the obstacles (4).

8. The system according to claim 1 wherein the one or more control units (5) further determines the depth of said obstacles (4) according to a colour change differentiation level of each obstacle.

9. A method according to claim 3, characterized by further comprising the step of determining the depth of said obstacles (4) according to a colour change differentiation level of each obstacle.

* * * * *